United States Patent [19]

Hardigg et al.

[11] 4,331,748
[45] May 25, 1982

[54] SLIDING SEAL BATTERY COVER

[75] Inventors: James S. Hardigg, Baptist Hill; Edward W. Turner, Deerfield, both of Mass.

[73] Assignee: Hardigg Industries, Inc., South Deerfield, Mass.

[21] Appl. No.: 212,277

[22] Filed: Dec. 3, 1980

[51] Int. Cl.³ .............................................. H01M 2/08
[52] U.S. Cl. ..................................... 429/175; 429/184
[58] Field of Search ............... 429/175, 178, 180, 181, 429/184, 185

[56] References Cited

U.S. PATENT DOCUMENTS

| | | | |
|---|---|---|---|
| 1,364,861 | 1/1921 | Bliss | 429/180 X |
| 2,678,962 | 5/1954 | Jensen | 429/181 |
| 3,228,804 | 1/1966 | Weidner | 429/175 |
| 3,366,511 | 1/1968 | Rousey | 429/175 X |
| 3,652,340 | 3/1972 | Sharpe et al. | 429/184 |
| 3,918,993 | 11/1975 | Adderley et al. | 429/184 |
| 3,968,022 | 7/1976 | Eng | 429/180 X |
| 4,245,014 | 1/1981 | Veit, Jr. et al. | 429/181 |

Primary Examiner—Charles F. LeFevour
Attorney, Agent, or Firm—Cushman, Darby & Cushman

[57] ABSTRACT

The present invention comprises a battery cover that provides a sliding seal about the terminal posts of battery elements within a battery jar so that axial movement between the cover and such posts can occur when welding battery covers in place onto battery jars or during use of the battery to absorb any axial motion of the terminal posts due to plate growth.

Each opening is provided with upper and lower seals which together define a chamber between them and the outer surface of the terminal post. This chamber is connected by means of a passageway to an inlet port so that following insertion of the terminal post through the openings and through the upper and lower seals, sealant material can be inserted into that annular chamber. A complete seal will be provided about the periphery of the terminal post lying between the two seals that will allow relative movement between the cover and the terminal post. Following completion of the injection of sealant material an acid and heat resistant washer may be placed over the terminal post to protect the top of the seal area during fusion of battery connectors to the posts.

11 Claims, 4 Drawing Figures

SLIDING SEAL BATTERY COVER

BACKGROUND OF THE PRESENT INVENTION

For many years it has been known that during use at least the positive battery plates within a lead-sulphuric acid battery will become longer from the chemical reactions going on within the battery. In an effort to overcome any problems relating to such plate growth battery manufacturers have in the past provided additional space beneath plates. In some prior art batteries the plates themselves were hung within a heavy walled container which could support their weight. Accordingly, covers had always been held tightly in place so that no motion between the battery jar or the terminal posts was permitted. Any plate growth would be absorbed on the bottom and if problems developed the battery would be discarded or would be completely broken down and repaired.

In recent years the thickness of battery jars has been reduced to reduce the size and weight of batteries. Thus, it is desirable to have the battery plates rest on grids which in turn are directly mounted on the bottom of the jar. Also, one barrier to the use of polypropylene covers heat welded to polyproplyene battery jars has been the growth of the positive posts which has become a greater problem now that the plates essentially rest on the bottom. In such a circumstance, it is most important to provide some means of absorbing or allowing plate growth to occur any way that will not force the cover from the jar thereby ruining the battery for its intended purpose.

Another known attempt to find a solution to positive plate growth problems involved the use of a cover having wells in the shape of inverted truncated cones. An opening was provided in the center of the flat bottom portion and a rubber grommet was inserted. The terminal post was then passed through the grommet and the well surrounding the post, above the grommet, was filled with grease. Thereafter a protective washer was placed about the post to cover the well area and the grease held therein.

While this approach allowed the post to slip, the rubber grommet might lose its elasticity, permitting acid to flow upwardly along the post and between the post and the grommet, achieving proper fit between the post and grommet was a problem and the washer might be raised exposing the grease directly to dirt and other damaging conditions.

In an effort to overcome this problem we have discovered a way to create a seal that will allow some amount of relative movement between the cover and the terminal post without breaking the seal therebetween.

SUMMARY OF THE PREFERRED EMBODIMENT OF THE PRESENT INVENTION

Our invention comprises the formation of a sealed annular chamber about the outer periphery of a portion of the terminal post, following the insertion of that terminal post through an opening provided therefor in the battery cover and the subsequent injection of a grease-like sealant into the annular chamber. By providing upwardly sloping sealing flaps at both ends of that annular chamber it is possible to effect a seal at the bottom of the chamber that prohibits leakage of the sealant material in a downward direction thus prohibiting leakage of the material into the battery while at the same time providing a means for fully sealing the entire periphery of the terminal post in a way that will allow some amount of sliding of the post within the sealing assembly.

The cover itself is preferably comprised of an integral one piece structure which includes means defining a plurality of openings through which the terminal posts will pass. Each opening in the cover will have a sealing assembly including means defining an upper or top seal, an injection port and a passageway connecting the injection port into the area located beneath that first or upper seal. The remaining portion of the sealing assembly, constructed according to the present invention, is provided by welding a separate member directly beneath the opening area provided in the cover. This second member includes a depending collar having an inner diameter larger than the terminal post and a second or bottom sealing device. This second member is welded onto the cover so that the opening therethrough is coaxially aligned with the opening in the cover. Once the terminal post is inserted therethrough an annular chamber will be defined between the exterior of the terminal post, the two seals and the interior walls of the cover and collar structures.

When the cover is ultimately placed on the battery the terminal posts will first be fed through the lower seals and then upwardly through the annular chamber and out through and beyond the upper seals. Both sealing members will hug the exterior surface of the terminal post, which has an as cast surface, and each will be bent upwardly or deflected a slight amount to ensure proper sealing. In order to achieve the seal at each post a grease or other sealant material is injected into the annular space defined between the seals and the terminal post, through an injection port and a passage connecting that injection port with the annular chamber. Grease will flow circumferentially and radially in the annular space about the terminal post. It will initially flow downward around the post completely filling the chamber between the post and the inner vertical surfaces of the bottom welded member and will force the bottom seal into a tight engagement with the terminal post. The sealant material will finally flow in an upward direction and depending upon the quantity of sealant injected, or if pressure is sufficient, it will push out through the upper seal a predetermined amount. Thereafter, a tight fitting washer of heat and acid resistant material can be placed over each post and slid down into contact with the cover surrounding the terminal post thereby providing a surface which prevents lead from running down onto the cover when the connector link is fused to the terminal post.

The inner diameter of the opening just below the upper gland is preferably made as small as possible, with respect to the outer diameter of the terminal post, preferably about 0.010 inches in excess of the outer diameter of the terminal post so as to provide a minimum amount of sliding clearance therebetween. This helps ensure that while the fit will not impede vertical motion of the post due to plate growth the radial clearance will be such that under a side-wise impact, such as when the battery element itself moves laterally relative to the cover, the motion of the terminal post will be relatively small. The upper seal will remain in contact with the terminal post around its entire circumference and the close fitting area beneath that seal will also tend to protect the seal against side-wise shocks as may be encountered in handling and use.

Other objects, features, and characteristics of the present invention as well as the methods and operation and function of the related elements of the structure, and to the combination of parts and economies of manufacture, will become more apparent upon consideration of the following description and the appended claims with reference to the accompanying drawings, all of which form a part of this specification, wherein like reference numerals designate corresponding parts in the various figures.

BRIEF DESCRIPTION OF THE DRAWINGS

The preferred embodiment of the present invention is set forth in a series of figures which are as follows.

DETAILED DESCRIPTION OF THE PREFERRED EXEMPLARY EMBODIMENT

Figure 1:
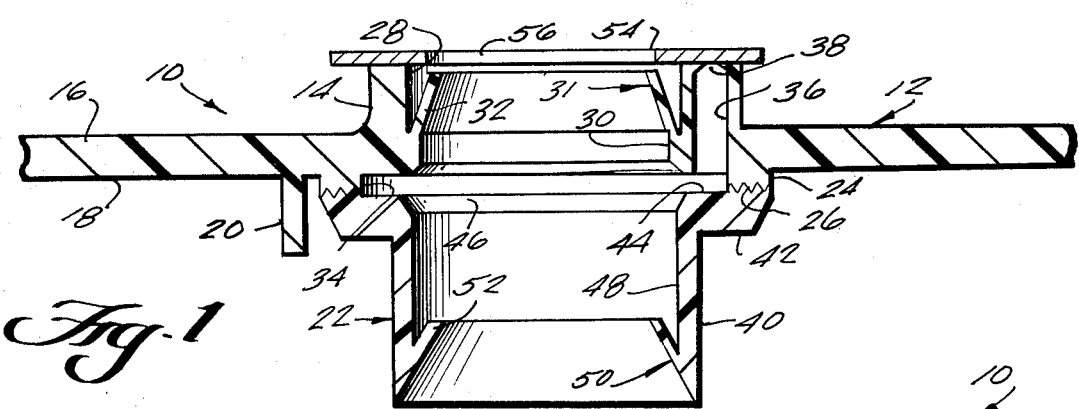
FIG. 1 is a partial cross-sectional view of the cover structure and sealing system therefor.
Figure 2:
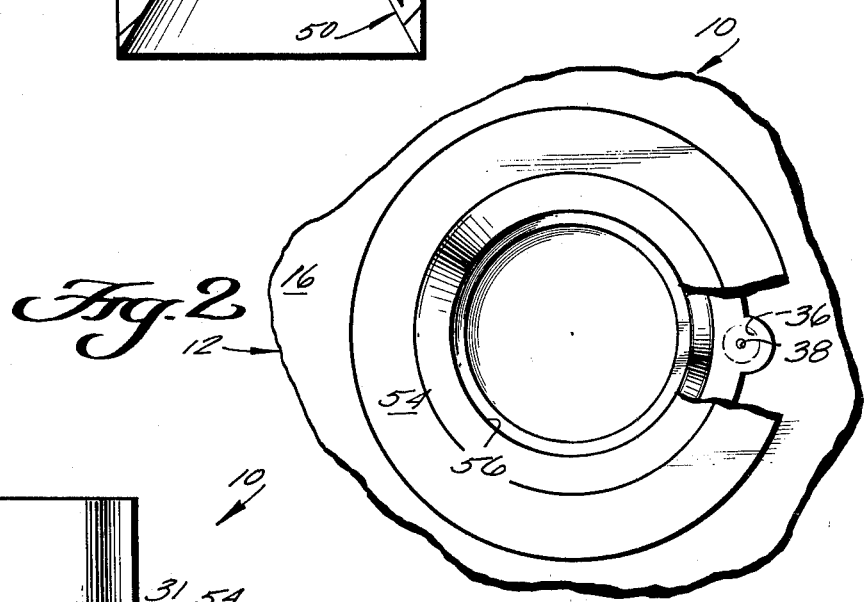
FIG. 2 is a top plan view of the terminal post opening shown in FIG. 1 above.

Turning to the figures, the preferred exemplary embodiment of the present invention comprising a sliding sealing assembly for terminal posts is generally indicated at 10. It is comprised of a battery cover 12 injection molded as an integral one piece unit from polypropylene although other moldable materials could be used. While the following description will be limited to a single terminal post opening and sealing assembly it should be understood that each of the positive post openings in the cover will contain a sealing assembly of a like design.

Each opening is defined by an upstanding collar 14, an upper surface 16, a lower surface 18, guide pins 20 for helping to position a lower, separate cylindrical member or segment, bottom cylindrical member prior to welding generally indicated at 22. The cover also includes a lower depending collar 24 extending downwardly from the lower surface 18 with the bottom surface of collar 24 being provided with a grooved structure indicated at 26.

Upstanding collar 14 has an interior surface 28. A cylindrical member 30 extends inwardly from surface 28 and a first gland member 31 and specifically conically shaped flexible sealing member 32 extends upwardly and inwardly from member 30.

Depending collar 24 serves to define an annular chamber 34 having an internal diameter larger than that of the interior area within collar 14 so as to extend radially outwardly beneath collar 14. A passageway 36 is provided within a portion of collar 14 and serves to connect annular chamber 34 with an inlet port 38 located in the top surface of upstanding collar 14. It should be understood that the size of chamber 34 is not critical so long as there is a passageway provided connecting that chamber with inlet port 38.

Inlet port 38 can be molded so that a thin membrane of polypropylene or the molding material is left covering it except in the very center of the port itself. Thus, while a sealant injector nozzle can be subsequently pushed through the opening in the center of that membrane to insert sealant material therethrough, when the nozzle is removed the membrane can recover so as to substantially close the port. Thus, a connecting passage is provided from injection port 38 through passage 36, annular chamber 34, and upwardly along the interior surface of annular member 30 and the interior of sealing member 32.

The lower cylindrical member or segment 22 can be bonded either by spin welding, ultrasonics or any other convenient method to the bottom surface of depending collar 24. As indicated, that surface of depending collar 24 can be grooved as at 26 in order to provide sufficient heating of that surface to cause bonding during spin welding, however, if some other type of adhesion means were used it might not be necessary to provide the groove structure as indicated at 26 for the bottom surface of depending collar 24.

Cylindrical member or segment 22 is comprised of a main cylindrical portion 40, an outwardly extending flange 42 having an upper surface 44 the outer portion of which will mate with groove surface 26 while the inner portion extends radially inwardly past the walls of annular chamber 34. The upper opening which extends through cylindrical segment 22 is bevelled as at 46 with the interior side wall of cylindrical segment 22 being indicated at 48. A second gland member 50 is formed about the lower portion of cylindrical segment 22 with the entire segment 22 being cast in a one piece manner. The second gland member 50 is also conically shaped with that gland member extending from the bottom of the cylindrical segment 22 up into the opening of that segment and terminating with an inwardly extending flexible portion 52.

The final element of the sealing assembly can include a sealing washer 54 which is also a separate member which will have a central opening 56 for fitting tightly about the terminal post. By constructing washer 54 out of an acid and heat resistant material, such as fibrous of plastic material, it will provide a way to both protect the area about the opening through which the terminal post will extend from molten lead when the terminal post is fused to a connector link and from the effects of any acid as the battery is being used.

Figure 3:
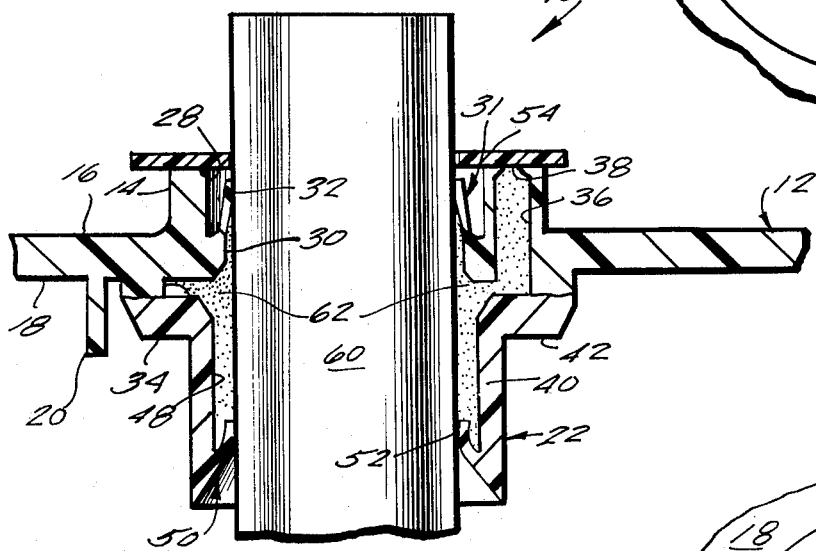
FIG. 3 is a cross-sectional view of the terminal post sealing structure shown in FIG. 1 with the terminal post and sealing material in place.
Figure 4:
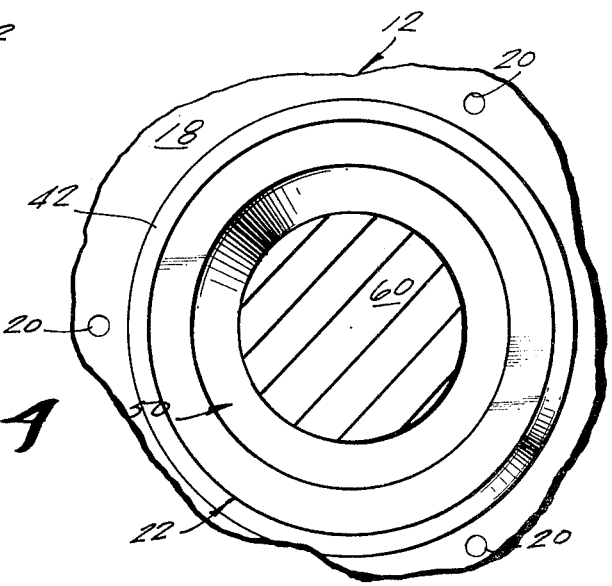
FIG. 4 is a partial bottom view of the structure shown in FIG. 3.

Turning now to FIG. 3, the post sealing assembly 10 is shown in its completed form with a terminal post 60 in place. As is shown, terminal post 60 extends through sealing glands 31 and 50 and deflects the flexible portions thereof, 32 and 52 respectively, toward interior walls 28 and 48, respectively. A sealant material has been injected through port 38 and fills each of the annular chambers defined between the top and bottom glands and the exterior surface of terminal post 60. This sealant is indicated at 62. Likewise, a washer 54 has been slid into place over the portion of terminal post 60 extending above cover 12 into contact with the top surface of the upstanding collar 14.

We have found that a wide variety of sealant materials can be used so long as they remain relatively non-flowing of which the following are exemplary: a high temperature grease such as, Vitex V-10, AP manufactured by Vitex Lubricants, Inc., Brooklyn, N.Y. having a penetration number 290; or a silicone grease such as Kantmelt HD manufactured by the Specialty Products Company of Jersey City, N.J. exhibiting a pentration number of 200. Preferably the sealant material should have a softening point above 160° F. and a penetration number ranging from about 200 to about 400.

Through the use of the two flexible glands and the chamber defined therebetween, about the exterior of the terminal post, it is possible to use posts having as-cast surfaces so that machining and other post casting treatments are not necessary.

We have found that designing sealing openings and covers in this fashion allows a wide variety of fit conditions to be met while still providing a complete seal about the terminal post.

Attention is also directed to a co-pending and commonly assigned application U.S. patent application, Ser. No. 119,972 which refers to battery cover welding apparatus. We have found that the seals as described herein can be used with such welding apparatus in that the covers 12 are vertically movable on the terminal posts without large friction forces so that the covers can be raised and lowered to effect welding of the covers to the battery jars and the material pertaining thereto from the above-identified application is hereby incorporated herein by reference thereto.

In this regard, polypropylene covers with lead bushings are sometimes difficult to move up and down ther terminal posts during welding of covers to battery jars because the lead terminal posts are not perfectly aligned with the bushings and galling may occur which creates resistance to movement of the cover thereby interfering with the welding process.

Since the seals in the cover of the present invention are preferably comprised of polypropylene which has a low friction coefficient, the seals have been found to slide up and down the posts with sufficiently low friction so as not to interfere with the welding process. If still lower friction is desired, a small amount of lubricant may be applied to the seals prior to placing the cover on the jar.

As is clear from FIG. 3, as sealant 62 is inserted through inlet port 38 it will first pass through passageway 36 and flow through chamber 34 around the exterior of post 60. Since the opening below chamber 34 is larger it will next flow downwardly along the surface of terminal post 62 toward flexible portion 52 of the lower sealing gland member 50. As the sealant flows about flexible member 52, which is already in tight engagement with terminal post 60, that member 52 will achieve a tighter fit assuring an effective seal. Thereafter, the sealant 62 will completely fill the space between wall 48 and the exterior of the terminal post 60, and then flow upwardly toward the interior of flexible member 32. Depending upon the pressure of injection and the amount of sealant being used a small amount may or may not be allowed to escape beyond flexible portion 32. The lower seal effected by flexible member 52 will not leak sealant into the battery as any increase in pressure will simply improve the seal between member 52 and the terminal post and any sealant that escapes from the joint formed between member 32 and the terminal post will be pressed down when washer 54 is inserted. Washer 54 also serves to fully close and protect injection port 38.

Thus, the present invention describes a battery post sealing assembly that not only provides an effective sliding seal about terminal posts which allows terminal posts to move relative to the battery cover without breaking the seal therebetween and at the same time provides a stable and strong lateral support between the battery cover and the terminal posts.

While the invention has been described in connection with what is presently considered to be the most practical and preferred embodiment, it is to be understood that the invention is not to be limited to the disclosed embodiment but, on the contrary, is intended to cover various modifications and equivalent arrangements included within the spirit and scope of the appended claims, which scope is to be accorded the broadest interpretation so as to encompass all such modifications and equivalent structures.

What is claimed is:

1. A battery cover for enclosing a battery jar and providing sliding seals about terminal posts extending therefrom comprising a body member having means defining a plurality of positive and negative terminal post openings each for receiving a terminal post, each opening for at least the positive posts comprising first and second flexible sealing means positioned at spaced apart locations within said opening for providing two spaced apart seals about the terminal post, said first and second flexible sealing means together with the terminal post defining an annular chamber therebetween, means defining an inlet to said annular chamber so that following insertion of the terminal post, a sealant can be injected through said inlet to fill said annular chamber so that a sliding seal is formed about the terminal post.

2. A battery cover having a body portion having means defining a plurality of positive and negative terminal post openings for receiving a terminal post therein, at least each of said positive post openings, having first gland means secured therein for sealing about said terminal post, means defining an upper annular chamber about said terminal post located adjacent said first gland means, means defining an inlet to said upper annular chamber, means defining a lower annular chamber about said terminal post and opening into said upper annular chamber, and second gland means located at and defining the bottom of said lower annular chamber for sealing the bottom of said lower annular chamber about said terminal post when said terminal post is inserted therethrough.

3. A battery cover as in claim 2 wherein the axis of said opening, and said upper and lower chambers are axially aligned.

4. A battery cover as in claim 2 further including washer means for tightly engaging and sliding down the portion of the terminal post extending above said cover and for engaging the upper surface of said means defining said opening.

5. A battery cover as in claim 2 further including a sealant material injected through said inlet so as to fill said upper and lower annular chambers thereby creating a sliding seal about said terminal post that allows axial movement thereof.

6. A battery cover as in any one of claims 2, 3, 4 or 5 wherein said body portion and said means defining said upper annular chamber are molded as an integral, one piece structure and said means defining said lower chamber comprises a separately molded member secured to said body portion.

7. A battery cover as in claim 5 wherein the sealant material comprises grease.

8. A battery cover as in claim 5 wherein said sealant has a softening point above 160° F.

9. A battery cover as in claim 5 wherein said sealant has a penetration number ranging from about 200 to about 400.

10. A battery cover as in claim 5 wherein said sealant has a preferred penetration number of 290.

11. A battery cover including sealing means for sealing terminal posts projecting therethrough so that sliding action between the terminal posts and the cover can take place, said sealing means including first and second spaced apart flexible sealing members which define between them an annular chamber and a sealant material within said annular chamber in contact with that portion of the terminal post lying therein for sealing about that terminal post while simultaneously permitting the sliding action to occur.

* * * * *